US012674951B2

(12) United States Patent
  Gomatam

(10) Patent No.: US 12,674,951 B2
(45) Date of Patent: Jul. 7, 2026

(54) METHOD OF INTERMITTENTLY BONDING OPTICAL FIBERS AND INTERMITTENTLY BONDED OPTICAL FIBER RIBBON USING THE METHOD

(71) Applicant: Sterlite Technologies Limited, Gurgaon (IN)

(72) Inventor: Badri Gomatam, Gurugram (IN)

(73) Assignee: Sterlite Technologies Limited, Gurugram (IN)

( * ) Notice: Subject to any disclaimer, the term of this patent is extended or adjusted under 35 U.S.C. 154(b) by 1276 days.

(21) Appl. No.: 17/365,839

(22) Filed: Jul. 1, 2021

(65) Prior Publication Data

US 2022/0244481 A1      Aug. 4, 2022

(30) Foreign Application Priority Data

Feb. 3, 2021     (IN) .............................. 202111004709

(51) Int. Cl.
  *G02B 6/44*                    (2006.01)
(52) U.S. Cl.
  CPC ........... *G02B 6/4482* (2013.01); *G02B 6/448* (2013.01)

(58) Field of Classification Search
  CPC .............................. G02B 6/4482; G02B 6/448
  USPC ......................................................... 385/114
  See application file for complete search history.

(56) References Cited

U.S. PATENT DOCUMENTS

2021/0286143 A1* 9/2021 Kondapalli .......... G02B 6/4482

FOREIGN PATENT DOCUMENTS

JP          2019124936 A  *  7/2019  ........... G02B 6/3696

* cited by examiner

*Primary Examiner* — Jerry M Blevins
(74) *Attorney, Agent, or Firm* — Steven R. Fairchild; Michael J. Pennington

(57) ABSTRACT

A method of deriving a bonding pattern for intermittently bonding optical fibers includes generating a random number, which is an integer, converting the integer into a binary series corresponding to a width-bonding pattern, applying the width-bonding pattern at a predefined position along a width of the intermittently bonded optical fiber ribbon (100) and repeating to obtain a subsequent predefined position on the intermittently bonded optical fiber ribbon (100). In particular, '0' represents the unbonded region if '1' represents the bonded region and '0' represents the bonded region if ' 1' represents the unbonded region.

19 Claims, 4 Drawing Sheets

100

400

Input initial values (such as seed value, k, N) and generate random number i.e., integer — 402

Convert the integer into binary series — 404

Apply width-bonding pattern at a predefined position — 406

Repeat above steps for subsequent predefined positions — 408

METHOD OF INTERMITTENTLY BONDING OPTICAL FIBERS AND INTERMITTENTLY BONDED OPTICAL FIBER RIBBON USING THE METHOD

CROSS-REFERENCE TO RELATED APPLICATIONS

This application claims the benefit of Indian Application No. 202111004709 filed by the applicant on 3 Feb. 2021, which is incorporated herein by reference in its entirety.

FIELD OF THE INVENTION

Embodiments of the present invention relate to a field optical fiber. And more particularly, relates to a method of deriving a bonding pattern for intermittently bonded optical fiber ribbon.

DESCRIPTION OF THE RELATED ART

Optical fiber cables are becoming denser by incorporating a large number of optical fibers with the help of intermittently bonded optical fiber ribbons that can roll on its axis and can be densely packed inside a buffer tube. Unlike conventional optical fiber ribbons that cannot be rolled due to the continuous application of an adhesive along a length of the optical fibers, in the intermittently bonded optical fiber ribbons, the adhesive is applied either randomly or in specific patterns along the length of the optical fibers.

The intermittent bonds enable the optical fiber ribbons to get rolled inside the buffer tube of the optical fiber cable or direct placement of optical fiber ribbon bundles inside a cable jacket, thus enabling the optical fiber cable to have a high density of optical fibers.

However, it is imperative that the materials used for the adhesive and bonding pattern used need to ensure structural integrity, planar alignment and impart flexibility to the intermittently bonded optical fiber ribbons. Further, it is important that the intermittently bonded optical fiber ribbons have a unique bonding pattern that helps the intermittently bonded optical fiber ribbons acquiring the capability to roll in perpendicular direction along the longitudinal length of the optical fibers by maintaining mechanical properties of the optical fibers.

Accordingly, to overcome the disadvantages of the prior art. Thus, there is a need to develop a method to overcome the cited disadvantages.

Hence, the present invention focuses on providing a method of intermittently bonding optical fibers and intermittently bonded optical fiber ribbon.

SUMMARY OF THE INVENTION

An embodiment of the present invention relates to a method of defining a bonding pattern for an intermittently bonded optical fiber ribbon. In particular, the method comprising steps of generating a random number, and the random number is an integer, converting the integer into a binary series, applying the width-bonding pattern at a predefined position on the intermittently bonded optical fiber ribbon and repeating above steps for subsequent predefined positions on the intermittently bonded optical fiber ribbon.

In particular, the binary series corresponds to a width-bonding pattern to be applied along a width of the intermittently bonded optical fiber ribbon. Moreover, '1' in the binary series represents one of 'a bonded region' and 'an unbonded region' and '0' represents 'an unbonded region' if '1' represents 'a bonded region', and '0' represents 'a bonded region' if '1' represents 'an unbonded region'.

In accordance with an embodiment of the present invention, the predefined position is defined along the length of the intermittently bonded optical fiber ribbon.

In accordance with an embodiment of the present invention, the width-bonding pattern is applied at the predefined position starting from one of edge fibers of the intermittently bonded optical fiber ribbon.

In accordance with an embodiment of the present invention, the distance between the subsequent predefined positions along the length can be randomized.

In accordance with an embodiment of the present invention, the distance between the subsequent predefined positions along the length is fixed.

In accordance with an embodiment of the present invention, the random number is derived from a pseudorandom number (PN) sequence.

In accordance with an embodiment of the present invention, the Pseudorandom Number (PN) sequence derives the pattern of the intermittent bonds and a bonding material such as an adhesive is applied at different positions (i.e., $P_1$, $P_2$, $P_3$ ... $P_N$) along the width and then repeated along the length of the plurality of optical fibers based the derived pattern of the intermittent bonds. Pseudo-randomness measures the extent to which a sequence of numbers, though produced by a completely deterministic and repeatable process, appear to be pattern-less.

In accordance with an embodiment of the present invention, the random number is chosen from $2^k$, $2^{k-1}$, $2^{k-2}$ or other possibilities. In particular, k is equal to the number of optical fibers-1.

Yet another embodiment of the present invention relates to the method comprising generating the random number that defines a bonding pattern for a first predefined instance and repeating the generating random number along the length of the intermittently bonded optical fiber ribbon.

Another embodiment of the present invention relates to an intermittently bonded optical fiber ribbon. In particular, the intermittently bonded optical fiber ribbon comprising a plurality of optical fibers and a bonding pattern defined by a random integer to intermittently bond the plurality of optical fibers.

In the proposed method, the bonding pattern is defined by converting the random integer into a binary series that corresponds to a width-bonding pattern to be applied along a width of the intermittently bonded optical fiber ribbon. In particular, '1' in the binary series represents one of 'a bonded region' and 'an unbonded region' and '0' represents 'an unbonded region' if '1' represents 'a bonded region', and '0' represents 'a bonded region' if '1' represents 'an unbonded region'.

In accordance with an embodiment of the present invention, the width-bonding pattern is applied at the predefined position that starts from one of edge fibers of the intermittently bonded optical fiber ribbon.

In accordance with an embodiment of the present invention, the distance between the subsequent predefined positions along the length can be randomized.

In accordance with an embodiment of the present invention, the distance between the subsequent predefined positions along the length is fixed.

In accordance with an embodiment of the present invention, the random number generated defines the bonding pattern for a first predefined instance and the random number generation is repeated along the length of the intermittently bonded optical fiber ribbon.

In accordance with an embodiment of the present invention, the bonding material applied for bonding the plurality of optical fibers forms a circular shape or a rectangular shape or a square shape or an elliptical shape or the like.

In accordance with an embodiment of the present invention, the bonding material is an adhesive, an ink composition, a UV (ultraviolet curable) resin, a thermosetting resin or a glue composition.

In accordance with an embodiment of the present invention, the pattern of intermittent bonding is repeated after a predefined number (N) and the pattern of intermittent bonding is applied over the length of the plurality of optical fibers.

In accordance with an embodiment of the present invention, the pattern of intermittent bonds derived using a pseudorandom number (PN) sequence for bonding the optical fibers along their width and length, obtains an intermittently bonded optical fiber ribbon with a unique bonding pattern.

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

The foregoing objectives of the present invention are attained by employing a method of defining a bonding pattern for an intermittently bonded optical fiber ribbon.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

ELEMENT LIST

Figure 1:
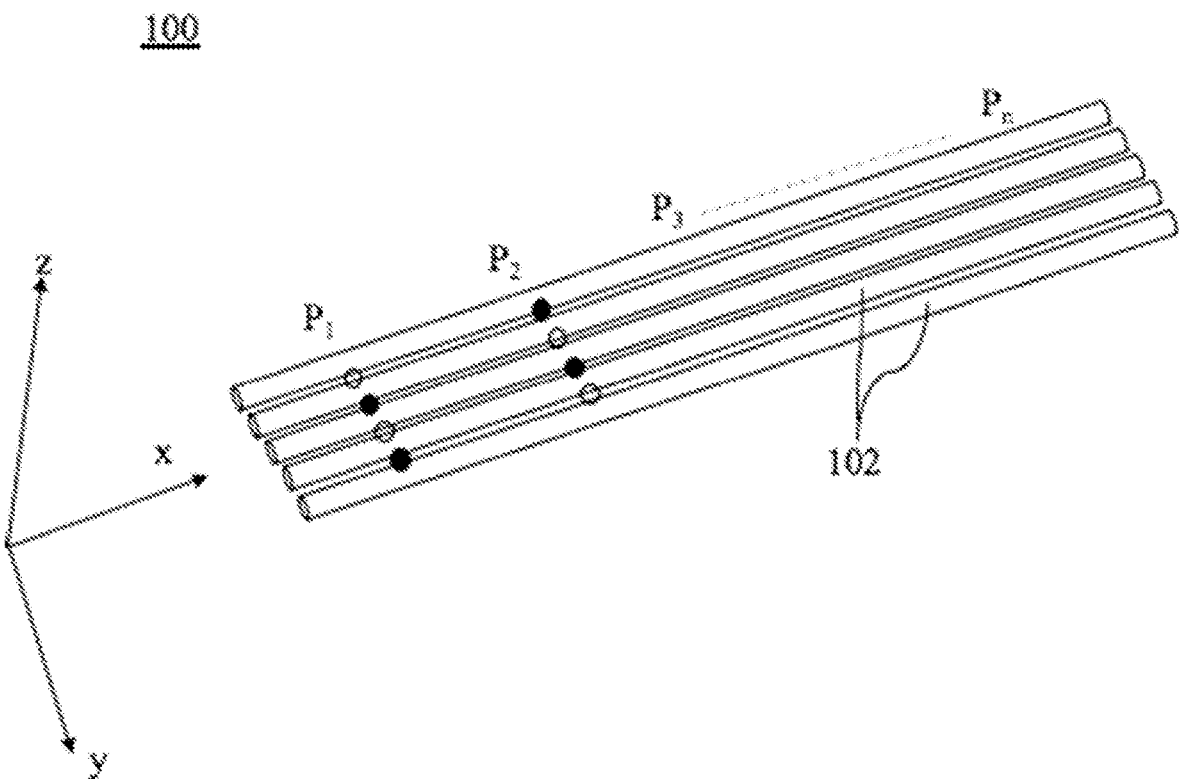
FIG. 1 is a pictorial representation illustrating arranged to obtain an intermittently bonded optical fiber ribbon in accordance with an embodiment of the present invention.

Intermittently Bonded Optical Fiber Ribbon 100
Plurality of Optical Fiber 102
Pattern of Intermittent Bond 104
Pattern of Intermittent Bond 106

The method illustrated in the accompanying drawings, throughout which like reference letters indicate corresponding parts in the various figures.

It should be noted that the accompanying figure is intended to present illustrations of exemplary embodiments of the present disclosure. This figure is not intended to limit the scope of the present disclosure. It should also be noted that the accompanying figure is not necessarily drawn to scale.

DETAILED DESCRIPTION OF THE INVENTION

The present invention relates to a method of deriving a bonding pattern for intermittently bonding a plurality of optical fibers and bonded optical fiber ribbon.

The principles of the present invention and their advantages are best understood by referring to FIG. 1 to FIG. 4. In the following detailed description numerous specific details are set forth in order to provide a thorough understanding of the embodiment of invention as illustrative or exemplary embodiments of the disclosure, specific embodiments in which the disclosure may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in details so as not to unnecessarily obscure aspects of the embodiments of the invention.

The following detailed description is, therefore, not to be taken in a limiting sense, and the scope of the present disclosure is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present disclosure.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The Following Brief Definition of Terms Shall Apply Throughout the Present Invention:

An optical fiber refers to a medium associated with signal transmission over long distances in the form of light pulses. The optical fiber uses light to transmit voice and data communications over long distances when encapsulated in a jacket.

FIG. 1 is a pictorial representation illustrating a plurality of optical fibers arranged to obtain an intermittently bonded optical fiber ribbon (100) (hereinafter referred to as intermittently bonded ribbon) in accordance with an embodiment of the present invention. The bonding pattern for intermittently bonding the plurality of optical fibers, that are placed parallelly, with a bonding material in a unique pattern. In particular, intermittently bonded optical fiber ribbon is a type of ribbon in which joined sections and non-joined sections are provided intermittently along a lengthwise direction and the joint section can be defined by a bonding pattern, which may be a unique pattern. Subsequently, the bonding material disposed between the plurality of fibers in a certain fashion is defined as a bonding pattern. Further, the unique pattern of intermittent bonds is formed at different positions (i.e., $P_1$, $P_2$, $P_3$, . . . , $P_N$) along a width (hereinafter along a width may also be referred to as width-bonding) and then repeated along a length of the plurality of optical fibers.

In particular, the plurality of optical fibers (102) placed in the XY plane are parallel to each other and bonded with the unique pattern. Moreover, the plurality of optical fibers (102) are bonded with a bonding material such as but not limited to an adhesive applied in a unique pattern.

In an exemplary illustration, a group of five optical fibers (102) arranged in the XY plane. The optical fibers (102) may be defined by a plurality of axes/planes. In other words, the plurality of optical fibers (102) are arranged in the plurality of planes (X, Y), where the length of the plurality of optical fibers (102) is defined by X axis/plane and the width of the plurality of optical fibers (102) is defined by Y axis/plane.

In particular, the pattern (bonding pattern) of intermittent bonds is formed first along the width and then at different positions (along length) (i.e., $P_1$, $P_2$, $P_3$, . . . , $P_N$) of the plurality of optical fibers (102).

In an implementation, there are five optical fibers arranged to obtain the intermittently bonded optical fiber ribbon (100).

In an alternative embodiment of the present invention, there may be more than five optical fibers arranged to obtain the intermittently bonded ribbon (100).

In yet another alternative embodiment of the present invention, there may be less than five optical fibers arranged to obtain the intermittently bonded ribbon (100).

In accordance with an embodiment of the present invention, the plurality of optical fibers (102) may have a diameter of 250 μm (micrometers or microns). Alternatively, the plurality of optical fibers may have other suitable diameters.

In accordance with an embodiment of the present invention, the optical fibers may be but not limited to single-mode optical fibers or multi-mode optical fibers or multicore optical fibers. The optical fibers may be of ITU.T G.657A2 category. Alternatively, the plurality of optical fibers may be of ITU.T G.657A1 or G.657B3 or G.652D or other category.

In accordance with an embodiment of the present invention, the intermittently bonded ribbon (100) is formed by applying the bonding material in an identified (or using generated) pattern. In particular, bonding material ensures structural integrity, planar alignment and impart flexibility to the intermittently bonded ribbon and maintains the mechanical properties of the plurality of optical fibers (102).

In accordance with an embodiment of the present invention, the bonding material bonding the plurality of optical fibers (102), may be but not limited to an adhesive, an ink composition, a UV (ultraviolet curable) resin, a thermosetting resin, a glue composition or the like.

In accordance with an embodiment of the present invention, the bonding material may be applied by using a Videojet printer or a continuous ink jet printer or by use of thermal transfer process or by laser printing or via cured adhesive or the like.

In accordance with an embodiment of the present invention, the bonding material may be applied in a particular shape. In particular, the shape may be anyone of a circular, rectangular, square, elliptical or the like.

Figure 2:
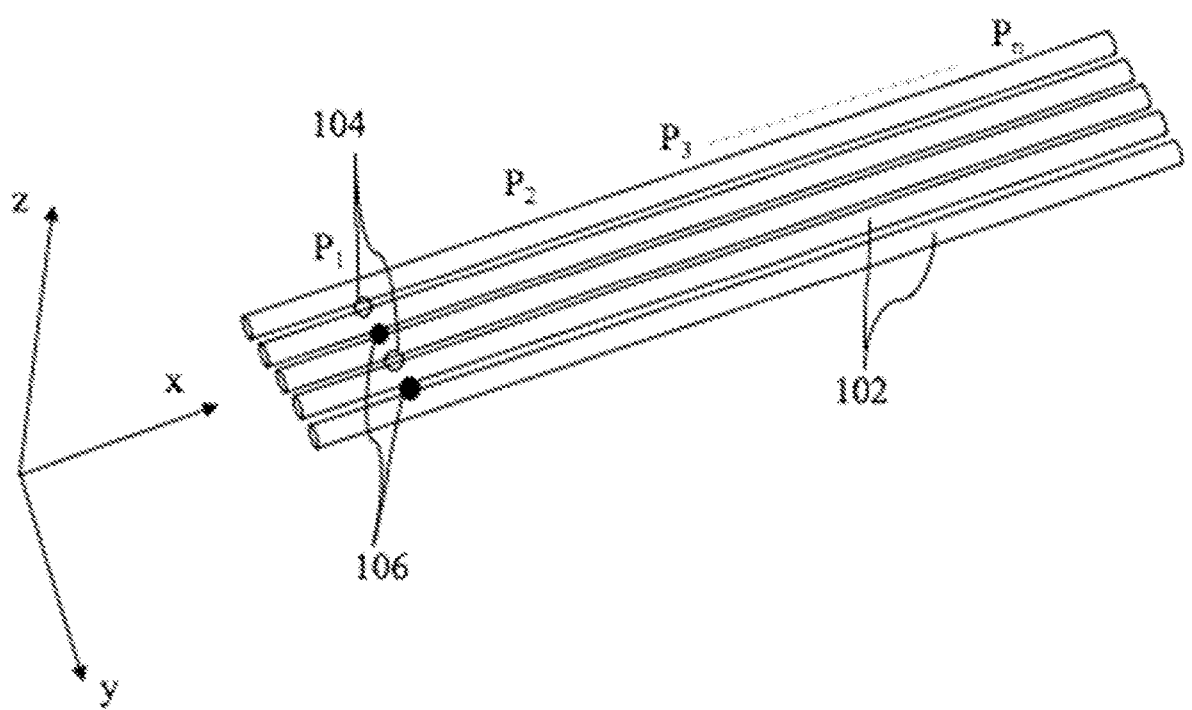
FIG. 2 is a pictorial representation illustrating a pattern of intermittent bonds for bonding the plurality of optical fibers in accordance with an embodiment of the present invention.

FIG. 2 is a pictorial representation illustrating a pattern of intermittent bonds for bonding the plurality of optical fibers in accordance with an embodiment of the present invention. In particular, the bonding material may be applied in the identified/generated pattern to form the intermittent bonds.

In an aspect of the present invention, a Pseudorandom Number (PN) sequence (hereinafter referred to as PN Sequence) is used to derive the pattern of the intermittent bonds and a bonding material such as an adhesive is applied at different positions (i.e., $P_1$, $P_2$, $P_3$ . . . $P_N$) along the width and then repeated along the length of the plurality of optical fibers based the derived pattern of the intermittent bonds. Pseudo-randomness measures the extent to which a sequence of numbers, though produced by a completely deterministic and repeatable process, appear to be patternless.

The approach to generate the pattern of the intermittent bonds (also be called as bonding pattern) for bonding the plurality of optical fibers. Moreover, the pattern of the intermittent bonds along the width and then along the longitudinal length of the plurality of optical fibers (102) at predefined positions ($P_1$, $P_2$, $P_3$, . . . , $P_N$) is formed by implementing a PN sequence generated by a pseudorandom number generator. That is, the intermittent bond is formed by applying the bonding material based on the PN sequence.

In accordance with an embodiment of the present invention, the pseudorandom number (PN) generator generates a defined set of values or integers that are statistically random in nature and are derived from a known starting point. Herein, the set of values or integers are whole numbers within a defined range. Particularly, the pseudorandom numbers provide necessary values for processes that require randomness.

In other words, a pseudorandom number generator generates a sequence of numbers whose properties approximate the properties of sequences of random numbers. The PN generated sequence is not truly random, because it is determined by an initial value, called the seed value.

In an implementation of the present invention, the pattern of the intermittent bonds is formed or applied along the width (i.e., width-bonding pattern) of the plurality of optical fibers (102) (i.e., in y-plane) that is extended or continued towards the length of the plurality of optical fibers (102) at different predefined positions ($P_1$, $P_2$, $P_3$, . . . , $P_N$). Particularly, the width-bonding pattern is applied at a predefined position on the intermittently bonded optical fiber ribbon (100) and the predefined position is defined along the length of the intermittently bonded optical fiber ribbon (100).

Moreover, the predefined position may start from one of edges on the intermittently bonded optical fiber ribbon (100).

Alternatively, the pattern of the intermittent bonds is formed or applied in any other suitable manner. The pattern is defined by a random number i.e., the PN sequence.

In accordance with an embodiment of the present invention, the PN sequence may be a set of integers that are generated by the following equation:

$$P_N=(a*P_{N-1}+c)\text{modulo } c$$

where, $P_N$ is the sequence of pseudo-random values;
$P_0$, $0<=P_0<m$, where m is a seed or start value;
a, $0<a<m$, where a is a multiplier;
c, $0<=c<m$, where c is an increment.

In accordance with an embodiment of the present invention, the above equation generates a next random integer using a previous random integer, an integer constant, and an integer modulus. However, it requires the start value m, that must be provided by a user. An appearance of randomness is provided by performing modulo arithmetic.

In accordance with alternative embodiment of the present invention, other algorithms may also be used to generate random numbers.

In another implementation of the present invention and continuation of the above approach, a Pseudorandom Binary Sequence (PRBS), which is a special case of PN, may be generated that defines the bonding pattern (or pattern). The bonding pattern may be a binary series. In particular, binary is a numbering system with base 2 that is a series of 1s and 0s.

In PRBS, the binary series of '1' or '0' is derived (or converted) from the random number or the integer generated. The pattern of intermittent bonds corresponding to the converted binary series of the random number or the integer is applied at a predefined position $(P_1, P_2, P_3, \ldots, P_N)$, where the predefined position is defined along the length of the intermittently bonded optical fiber ribbon (100).

In an exemplary example, in a group of five optical fibers, the pattern of intermittent bonds can be derived as: If $P_N$ generated number at $P_1$=5, the corresponding PRBS series is "0101" (for 4 bits pattern). The converted binary series "0101" becomes the pattern of intermittent bonds (104, 106) (as illustrated in FIG. 2). In the derived binary series "0101", the value '1' represents that the bonding material has to be applied at the predefined position and the value '0' represents that the bonding material need not to be applied.

Alternatively, the value '0' represents that the bonding material has to be applied at the predefined position and the value '1' represents that the bonding material need not to be applied. That is, '1' in the derived binary series represents one of 'a bonded region' and 'an unbonded region' and '0' represents 'an unbonded region' if '1' represents 'a bonded region', and '0' represents 'a bonded region' if ' 1' represents 'an unbonded region.

In another exemplary example, in "0101", a first bit signifies bonding between edge fibers of the optical fiber ribbon i.e., first and second fiber in the optical fiber ribbon, a second bit signifies bonding between second and third fiber and so on. Otherwise, the first bit between another edge fibers i.e., last (5th) and second last (4th) fiber and so on. Typically, an edge fiber is an outermost fiber in the optical fiber ribbon. In other words, the first bit defines a bonding decision (bonded/unbonded) between the first and second fibers in the optical fiber ribbon. The first fiber may be taken from any of the two ends of the optical fiber ribbon. Then, a next bit given bonding decision for second and third fibers, and so on until the last bit. The first bit may be a least significant bit of the binary series.

In accordance with alternative embodiment of the present invention, the first bit may be the most significant bit of the binary series. Hence, with 4 bits, a total number of 16 possibilities or 16 patterns of the intermittent bonds can be derived by $2^k$, where k=4), where k is equal to the number of optical fibers in a ribbon-1.

In accordance with alternative embodiment of the present invention, the total number of possibilities may vary and the total number of possibilities or patterns may be defined manually or by using other suitable methods.

In accordance with an embodiment of the present invention, the binary series derived may be '0000' and '1111' that are undesirable due to some mechanical constraints. Hence, $2^{K-2}$ possibilities may be considered to avoid such binary series.

In an implementation of the present invention, the random number and thus the binary series may be chosen from $2^k$, $2^{k-1}$, $2^{k-2}$ or any other suitable possibilities, where k is equal to the number of optical fibers in a ribbon-1.

In accordance with an embodiment of the present invention, another important variable to be decided is N. Particularly, the variable 'N' defines the number of positions after which the pattern of the intermittent bonds should be repeated i.e., subsequent predefined positions $P_1$, $P_{N+1}$, $P_{2N+1}$ and so on and so forth. Moreover, the sequence of the pattern of the intermittent bonds may be repeated after every N positions i.e. $(P_1, P_2, P_3, P_4, \ldots P_N, P_1, P_2, P_3, P_4, \ldots P_N, P_1, P_2, P_3, P_4, \ldots P_N, P_1, P_2, \ldots)$ and the sequence is applied over the entire length (longitudinal length) of the plurality of optical fibers.

Alternatively, bonding can be applied over the entire length with random numbers without repeating the sequence. Further, a distance between the subsequent predefined positions along the length can be randomized or fixed.

In accordance with an embodiment of the present invention, the random number that defines bonding pattern is generated for a first predefined instance and the random number generation is repeated along the length of the intermittently bonded optical fiber ribbon (100).

In accordance with another embodiment of the present invention, the proposed method of intermittently bonding the plurality of optical fibers, a printable bonding pattern may be applied continuously across the XYZ axes with use of a printer. In particular, the printer may be, but not limited to an inkjet printer modified in such a way that uses the bonding material to print and form the pattern of intermittent bonds on the plurality of optical fibers (102).

In accordance with an embodiment of the present invention, the printable bonding pattern can be decided using a specialized printer. Moreover, the bonding patterns may be reconfigured.

In an exemplary example, the specialized printer is VIDEOJET™ that is configured to print the bonding patterns on the plurality of optical fibers.

In accordance with alternative embodiment of the present invention, the bonding material may be combinedly used with the ink as well.

Figure 3:
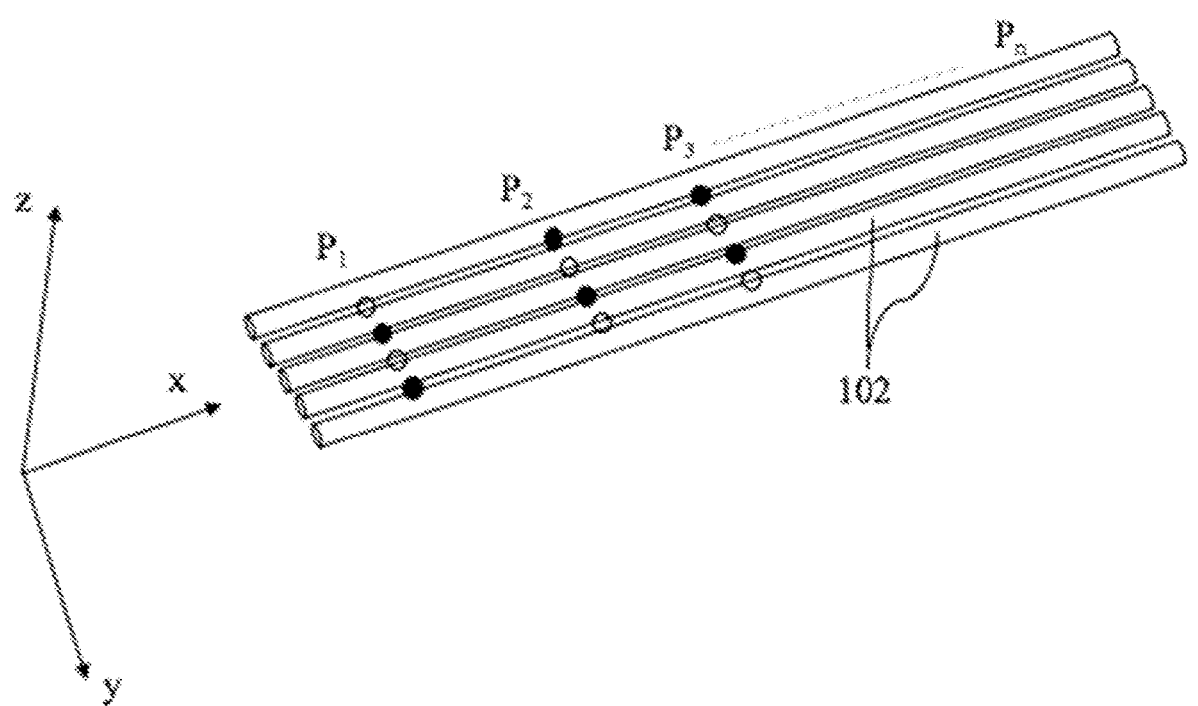
FIG. 3 is a pictorial representation illustrating an exemplary example of intermittently bonded optical fiber ribbon in accordance with an embodiment of the present invention.

FIG. 3 is a pictorial representation illustrating an exemplary example of the intermittently bonded optical fiber ribbon in accordance with an embodiment of the present invention. In particular, the intermittently bonded optical fiber ribbon is obtained by the proposed approach and has a pattern based on a pseudorandom number (PN) sequence. The intermittently bonded ribbon may have a pitch of 250 μm. Moreover, the intermittently bonded ribbon may use a color-coded ribbon matrix, band stripe printing or the like for ribbon identification.

In accordance with alternative embodiment of the present invention, the pitch may vary.

Figure 4:
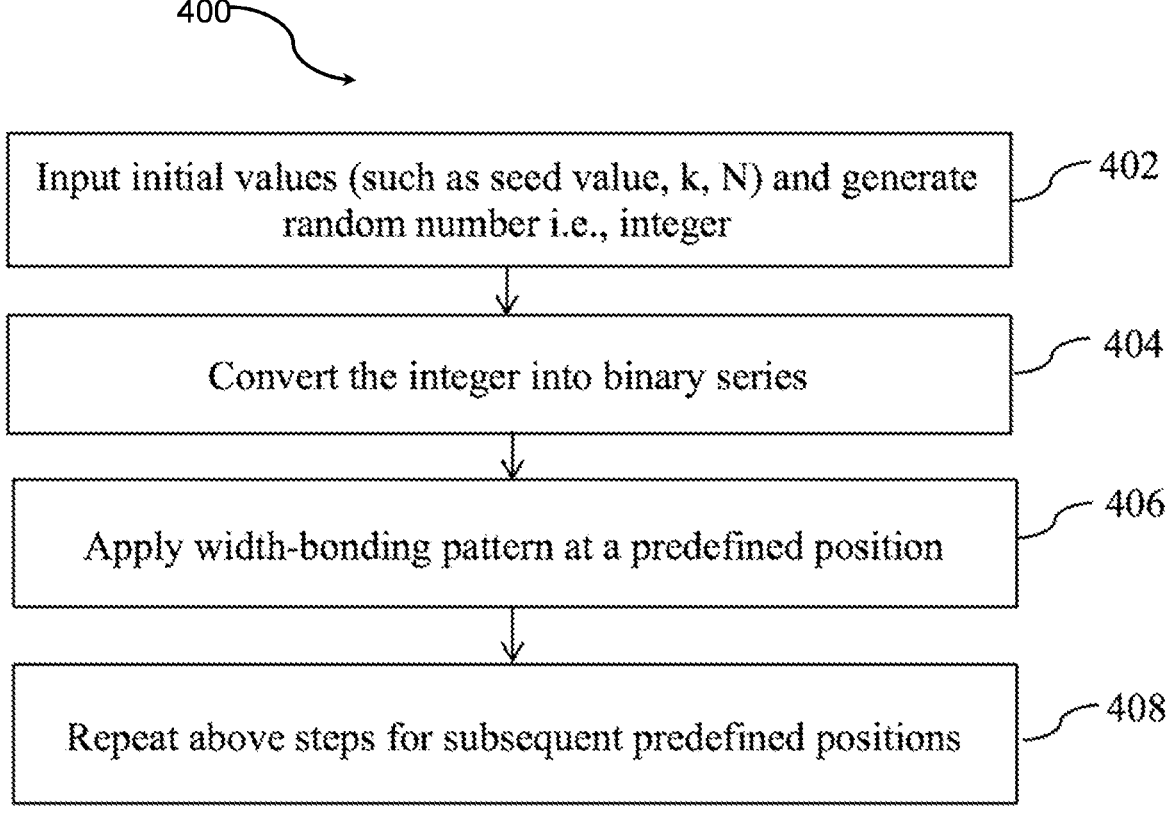
FIG. 4 is a flow chart illustrating a method for defining a bonding pattern for intermittently bonding the plurality of optical fibers in accordance with an embodiment of the present invention.

FIG. 4 is a flow chart illustrating a method for defining a bonding pattern for intermittently bonding the plurality of optical fibers in accordance with an embodiment of the present invention.

The method 400 starts at step 402 and proceeds to step 404, 406, 408.

At step 402, initial values (such as seed value, k, N) are input and the random number is generated. In particular, the random number is an integer.

At step 404, the integer is converted into the binary series. Particularly, the binary series corresponds to the width-bonding pattern to be applied along the width of optical fibers arranged for intermittent bonding. Moreover, '1' in the binary series represents one of the bonded regions and the unbonded region and '0' represents the unbonded region if '1' represents the bonded region, and '0' represents the bonded region if '1' represents the unbonded region.

At step 406, the width-bonding pattern is applied at the predefined position on the optical fibers arranged for intermittent bonding. In particular, the predefined position is defined along the length of the intermittently bonded optical fiber ribbon (100).

At step 408, the above steps are repeated for subsequent predefined positions on the intermittently bonded optical fiber ribbon (100).

It may be noted that the flowchart 400 is explained to have above stated process steps, however, those skilled in the art would appreciate that the flowchart 400 may have more/less number of process steps which may enable all the above stated embodiments of the present disclosure. Not all steps or states need to be reached.

Advantageously, by utilizing the above-mentioned techniques, each combination of bonding patterns is different, and the combination is impossible to detect unless seed and increment is known. Further, it is possible to design infinite combinations of bonding patterns and every ribbon can be uniquely customized or coded. Furthermore, with the implementation of the present invention, it may be possible to use ink as an adhesive. Subsequently, the present invention may use multiple printing wheel or programmable {Pn} sequences.

The method described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware.

The invention disclosed herein can be implemented using at least one software program running on at least one hardware device and performing network management functions to control the elements.

The results of the disclosed method may be stored in any type of computer data repository, such as relational databases and flat file systems that use volatile and/or non-volatile memory (e.g., magnetic disk storage, optical storage, EEPROM and/or solid state RAM). The various illustrative logical blocks, modules, routines, and algorithm steps described in connection with the invention disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the invention disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. Alternatively, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the invention disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

What is claimed is:

1. A method of defining a bonding pattern for an intermittently bonded optical fiber ribbon (100), wherein the method comprising generating a random number, and the random number is an integer;

converting the integer into a binary series corresponding to a width-bonding pattern;

applying the width-bonding pattern at a predefined position on the intermittently bonded optical fiber ribbon (100); and repeating above steps for a subsequent predefined position on the intermittently bonded optical fiber ribbon (100) wherein the width-bonding pattern is applied along a width of the intermittently bonded optical fiber ribbon (100).

2. The method as claimed in claim 1, wherein '1' in the binary series represents anyone of a bonded region and an unbonded region.

3. The method as claimed in claim 2, wherein '0' represents the unbonded region if 1' represents the bonded region and '0' represents the bonded region if '1' represents the unbonded region.

4. The method as claimed in claim 1, wherein the predefined position is defined along length of the intermittently bonded optical fiber ribbon (100).

5. The method as claimed in claim 1, wherein the width-bonding pattern is applied at the predefined position starting from one of an edge fiber of the intermittently bonded optical fiber ribbon (100).

6. The method as claimed in claim 1, wherein a distance between the subsequent predefined positions along length of the intermittently bonded optical fiber ribbon (100) is randomized.

7. The method as claimed in claim 1, wherein a distance between the subsequent predefined positions along length of the intermittently bonded optical fiber ribbon (100) is fixed.

8. The method as claimed in claim 1, wherein the random number is derived from a pseudorandom number (PN) sequence.

9. The method as claimed in claim 1, wherein the random number is chosen from $2^k$, $2^{k-1}$, $2^{k-2}$ wherein k is equal to number of optical fibers-1.

10. The method as claimed in claim 1, wherein the method further comprising a step of:

generating the random number defining bonding pattern for a first predefined instance; and repeating the generating random number along length of the intermittently bonded optical fiber ribbon (100).

11. An intermittently bonded optical fiber ribbon (100) comprising a plurality of optical fibers (102) and a bonding pattern defined by a random number integer to intermittently bond the plurality of optical fibers (102) such that the bonding pattern is a function of at least the random number, wherein the bonding pattern is a predefined instance that repeats itself along length of the intermittently bonded optical fiber ribbon (100), wherein the predefined instance has at least one instance where exactly two bonds are along width of the intermittently bonded optical fiber ribbon (100).

12. The intermittently bonded optical fiber ribbon (100) as claimed in claim 11, wherein the bonding pattern is defined by converting the random number into a binary series corresponding to a width bonding pattern;

applying the bonding pattern at a predefined position on the width of the intermittently bonded optical fiber ribbon (100).

13. The intermittently bonded optical fiber ribbon (100) as claimed in claim 12, wherein '1' in the binary series represents anyone of a bonded region and an unbonded region.

14. The intermittently bonded optical fiber ribbon (100) as claimed in claim 13, wherein '0' represents the unbonded region if '1' represents the bonded region and '0' represents the bonded region if '1' represents the unbonded region.

15. The intermittently bonded optical fiber ribbon (100) as claimed in claim 12, wherein the width-bonding pattern is configured to be applied at the predefined position starting from an edge fiber of the intermittently bonded optical fiber ribbon (100).

16. The intermittently bonded optical fiber ribbon (100) as claimed in claim 11, wherein a distance between subsequent predefined positions along the length is randomised.

17. The intermittently bonded optical fiber ribbon (100) as claimed in claim 11, wherein a distance between subsequent predefined positions along the length is fixed.

18. The intermittently bonded optical fiber ribbon (100) as claimed in claim 11, wherein the random number is derived from a pseudorandom number (PN) sequence.

19. The intermittently bonded optical fiber ribbon (100) as claimed in claim 11, wherein the random number is chosen from $2^k$, $2^{k-1}$, $2^{k-2}$, wherein k is equal to number of optical fibers-1.

* * * * *